United States Patent
Snelling

(10) Patent No.: US 9,507,956 B2
(45) Date of Patent: Nov. 29, 2016

(54) STORED DATA ACCESS CONTROLLER

(71) Applicant: FUJITSU LIMITED, Kawasaki-shi. Kanagawa (JP)

(72) Inventor: David Snelling, Buckinghamshire (GB)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 14/467,187

(22) Filed: Aug. 25, 2014

(65) Prior Publication Data

US 2015/0193636 A1     Jul. 9, 2015

(30) Foreign Application Priority Data

Jan. 9, 2014   (EP) ..................................... 14150683

(51) Int. Cl.
G06F 21/62     (2013.01)
G06F 17/30     (2006.01)

(52) U.S. Cl.
CPC ..... *G06F 21/6218* (2013.01); *G06F 17/30424* (2013.01); *G06F 17/30554* (2013.01); *G06F 17/30958* (2013.01); *G06F 21/6227* (2013.01)

(58) Field of Classification Search
CPC ..................... G06F 21/6218; G06F 17/30424; G06F 21/6227; G06F 17/30958; G06F 17/30554
USPC .......................................................... 726/28
See application file for complete search history.

(56) References Cited

U.S. PATENT DOCUMENTS

2014/0052749 A1*  2/2014 Rissanen ............. G06F 21/6227
                                                          707/759

OTHER PUBLICATIONS

"Information technology—Open Systems Interconnection—Security frameworks for open systems: Access control framework", *ISO/IEC 10181-3 International Standard (First Edition)*, Sep. 1996, 44 pp., ISO/IEC.
Lassila et al., "Resource Description Framework (RDF) Model and Syntax Specification", *REC-rdf-syntax-19990222 (W3C Recommendation)*, Feb. 1999, 35 pp., W3C.
Vollbrecht et al., "AAA Authorization Framework", *Network Working Group*, Aug. 2000, 25 pp., The Internet Society.
Westerinen et al., "Terminology for Policy-Based Management", *Network Working Group*, Nov. 2001, 15 pp., The Internet Society.
Alam et al., "Geospatial Resource Description Framework (GRDF) and security constructs", *Computer Standards and Interfaces*, Jan. 2010, 7 pp., Elsevier B.V.
Murray et al., "Semantic Technologies Developer's Guide", *Oracle® Database (11g Release 2)*, May 2010, 356 pp., Oracle.
Extended European Search Report issued Mar. 24, 2014, in corresponding European Patent Application No. 14150683.2.

* cited by examiner

*Primary Examiner* — Baotran N To
(74) *Attorney, Agent, or Firm* — Staas & Halsey LLP

(57) ABSTRACT

A stored data access controller, configured to control access to data items, stored in a data storage apparatus, composed of data values encoding a labelled link between a subject graph node and an object graph node. The stored data access controller comprising: a query module, configured to receive a query requesting a specified subset of the data items and further configured to obtain the specified subset of the data items as a preliminary query result. The stored data access controller further comprising: a suppression module, configured to obtain the preliminary query result from the query module, and to generate a revised version of the preliminary query result by selectively suppressing the data value of one or more graph nodes in accordance with access control information attributed to the label of a labelled link between the subject graph node and the object graph node.

12 Claims, 4 Drawing Sheets

STORED DATA ACCESS CONTROLLER

CROSS-REFERENCE TO RELATED APPLICATION

This application claims the benefit of European Application No. 14150683.2, filed Jan. 9, 2014, the disclosure of which is incorporated herein by reference.

BACKGROUND

1. Field

The present invention lies in the field of database management systems. In particular, invention embodiments relate to controlling data supplied in response to queries by applying access control.

2. Description of the Related Art

Resources, particularly data, need to be protected from unauthorized access. An architecture for implementing this process is called "Access Control", which is an implementation of the middle "A" in the AAA security protocol (Authentication, Authorization, and Audit). Access control can be broken into several, architecturally independent activities. The key roles in the access control process are described in [RFC 2094]. These concepts are used in the XACML standard to control access to resources, which resources may be stored as, or represented by, individual elements of data within a graph structured database. The following list highlights these roles as used in XACML, which provides a context in which embodiments may be implemented:

Policy administration point (PAP): the system entity that creates a policy or policy set;

Policy decision point (PDP): the system entity that evaluates applicable policy and renders an authorization decision. This term is defined in a joint effort by the IETF Policy Framework Working Group and the Distributed Management Task Force (DMTF)/Common Information Model (CIM) in [RFC3198]. This term corresponds to "Access Decision Function" (ADF) in [ISO10181-3]; Policy enforcement point (PEP): the system entity that performs access control, by making decision requests and enforcing authorization decisions. This term is defined in a joint effort by the IETF Policy Framework Working Group and the Distributed Management Task Force (DMTF)/Common Information Model (CIM) in [RFC3198]. This term corresponds to "Access Enforcement Function" (AEF) in [ISO10181-3]; Policy information point (PIP): the system entity that acts as a source of attribute values.

FIG. 4 illustrates an exemplary data flow in an XACML access control architecture. Steps S1 to S13 represent an ordered flow of information between access control entities. Embodiments of the present invention may be implemented in an XACML context to provide the functionality of the PEP and the PDP.

SUMMARY

Embodiments of the present invention include a stored data access controller, configured to control access to data items encoding graph data and stored in a data storage apparatus, each data item being composed of data values encoding a labelled link between a subject graph node and an object graph node; the stored data access controller comprising: a query module, configured to receive a query requesting, as a query result, a specified subset of the data items stored in the data storage apparatus, and configured to obtain data items belonging to the specified subset from the data storage apparatus as a preliminary query result; a suppression module, configured to obtain the preliminary query result from the query module, to generate a revised version of the preliminary query result by selectively suppressing information from the preliminary query result, and to output, as the requested query result in response to the received query, the revised version of the preliminary query result; wherein selectively suppressing information comprises, for the or each of one or more graph nodes, suppressing the data value representing the graph node in accordance with access control information attributed to the label of a labelled link between the graph node and another graph node, the graph node being either the subject graph node or the object graph node linked by the labelled link.

Advantageously, embodiments enable access to data values to be controlled at a fine-grained level, and do not require any extension of the database schema to include access control details stored at the core of each data value or each data item.

The obtaining of a preliminary query result prior to performing the suppression allows certain information to be extracted from the preliminary query result, such as counts of data items, even if data values from those data items are not going to be output in the query result.

Invention embodiments extend the meaning of the predicate or labelled link between two graph nodes to include access control information, or to include an identification of access control information. The suppression module is configured to interpret the labelled link as implying that particular access control information is to be applied to the preliminary query result. The access control information may be stored in association with the label of the labelled link in a storage unit or as part of the data graph. Alternatively, it may be that, for example, an access control information identifier is associated with the label of the labelled link, and the suppression module is configured to retrieve the access control information by using the identifier as a key. For example, the identifier may be "access control level x", with x taking a range of values, and each access control level corresponding to a different set of conditions determining when and in what way graph nodes linked by the labelled link should be suppressed from preliminary query results.

The graph node and the another node to which it is linked by a labelled link form a subject and object paring, so that one of the two nodes is a subject graph node and the other of the two nodes is an object graph node. Of course, a node which is the subject of one labelled relationship may be the object of another labelled relationship, and vice-versa. The identity of a graph node as either a subject graph node or an object graph node is a relative property dependent upon the relationship in question, thus both the subject graph node and object graph nodes linked by a labelled link can be considered "graph nodes", with the prefix "subject" or "object" being attributable to the graph nodes on a relationship-by-relationship basis.

A query specifies a subset by defining boundaries within which data values of particular elements of data items must fall for data items to be included in the query result. A query result may be in the form of a copy of one or more data items, or a copy of one or more data values of elements within data items. Alternatively or additionally, a query result may include information derived from the data items, such as a count of the number of data items satisfying a condition specified in the query. Thus, a query result contains information, which information may be data items and/or data values themselves, and/or information derived from assessing or analysing data values.

Invention embodiments control access to data by suppressing information from the query result at a suppression module. Suppressing information at the suppression module is performed in accordance with access control information attributed to the label of a labelled link between a pair of graph nodes including the graph node; a graph node being a collective term for subject graph nodes and object graph nodes. Suppressing information includes removing data values from a query result, anonymising or otherwise removing information from a data value (for example, replacing the data value with a count or a "true" label indicating that the data value exists), and therefore preventing the information from being included in the query result. Suppression is in accordance with access control information attributed to the label of a labelled link between graph nodes. In other words, the type of relationship between two graph nodes determines the access control information that should be applied. Access control information may simply instruct a suppression module whether or not, or how, to suppress subject or object nodes linked by a labelled relationship having a particular label. Furthermore, the access control information may be more sophisticated and may include one or more conditions which the suppression module must apply to determine whether or not, and possibly how, to suppress information from the preliminary query result. A labelled relationship effectively defines a property of the subject graph node, with the object graph node defining a range (or value) of the defined property for the subject graph node. In those terms, it can be appreciated that embodiments effectively enable a suppression module to identify when a preliminary result includes information describing a secure property or a regulated property, and to perform some access control in those circumstances. Access control information may be applied to any or all of the data values forming a data item having a label of a labelled link to which the access control information is attributed. The whole of the data item may be suppressed, or one or more of the individual data values composing the data item may be suppressed.

A labelled link may also be referred to as a predicate, and is a defined relationship between two graph nodes or resources. The label of the labelled link defines what the relationship, and the graph layout, that is, the two graph nodes linked by the labelled link, defines which graph nodes share said relationship. The format of data items encoding the data graph may be such that the two graph nodes linked by a labelled link, and the label of the labelled link, are each defined by a data value in the data item. Each data value may be considered an object, and may be a string object. The label of a labelled link may also be referred to as the type, name, or definition of the labelled link or predicate.

Embodiments may further comprise a predicate ontology storage unit configured to store the label of each of a plurality of labelled links from the encoded graph data in association with access control information attributed to the label.

Advantageously, the predicate ontology storage unit provides a mechanism for storing access control information in association with the labels of labelled links in the stored data. The predicate ontology storage unit is available to be referenced by the suppression module in order to interpret the predicates/labelled links of the preliminary query result and determine when or how to suppress information from the preliminary query result.

The attribution of properties (access control information) to predicates can be stored as an ontology in itself. The predicate ontology storage unit may be separate from the encoded graph data, or may be stored along with the extended graph data as an extension of the graph. The format of the main body of graph data is not disrupted by the inclusion of the predicate ontology storage unit, but additional data items in which a particular labelled link, or a label given to one or more labelled links, is the subject and the access control information (or a reference thereto or identification thereof) is the object, are included in the stored data. In particular, embodiments may:

The access control information attributed to the label of a labelled link may be identified by a data item having the labelled link as its subject and data identifying the access control information as its object.

Advantageously, including access control information in the data format of the encoded data graph provides an efficient to process mechanism for incorporating the access control information at the fine grained level. For example, if a labelled link has a particular label, then the labelled link (being the relationship between two specific graph nodes) may be considered to be an instance of the particular label, and certain properties (access control information) to be attributed to instances of the particular label are stored in association with the particular label in the predicate ontology storage unit. The predicate ontology storage unit is configured to store access control information which instructs the suppression module how to treat (i.e. what suppression to apply to) data items having particular data values for the data element representing the label of a labelled link, or predicate.

It may be that the access control information attributed to one label is inherited by other labels which are stored as children of the one label in the predicate ontology storage unit.

The access control information attributed to a label may specify (or contain conditions to be applied to determine the following), among other things: whether or not to suppress the (data value representing the) object graph node linked by a labelled link having the label (from the preliminary query result); whether or not to suppress the subject graph node linked by a labelled link having the label; and/or in what way to suppress the data values representing the graph nodes.

Optionally, suppressing data values comprises removing data values and/or anonymising data values.

Anonymising a data value may comprise modifying the data value with a predetermined fixed value such as '1' or 'true', so that in the revised version of the preliminary query result it can be determined that a data value exists, but not what the data value is stored as in the graph. Alternatively, it may be that certain data values are simply removed from the preliminary query result and therefore in the revised version of the preliminary query result (the version which is output in response to the query) data values are not present and there is no indication of their existence.

The access control information may comprise unconditional instructions on how and which data values to suppress for graph nodes linked by labelled links having particular labels. In addition, the access control information may comprise conditional instructions, which are to be applied if certain conditions or criteria (singular or plural) are fulfilled or satisfied.

The access control information may comprise a suppression condition and suppressing the data value representing the graph node in accordance with access control information comprises extracting the suppression condition, determining whether or not the suppression condition is satisfied, and if the suppression condition is satisfied, suppressing the data value.

In an alternative embodiment, suppressing data values representing object nodes in accordance with access control information attributed to the labels of the labelled links between the object nodes and respective subject nodes comprises: for each data value encoding an object node in the preliminary query results, identifying the label of the labelled link between the object node and the respective subject node, determining whether access control information attributed to the label comprises a suppression condition and if so, extracting the suppression condition from the access control information, and, if the suppression condition is satisfied, suppressing the data value.

The conditions may apply to attributes of the requester, to certain ranges of data values (suppress Object if Subject="Fred*"), to the content of the preliminary query result (suppress Object if ResultCount<5) or revised version of the preliminary query result, or to environmental conditions (suppress Object if Time >19:00).

Conditions to be applied by the suppression module in order to determine which data values to suppress and/or how to suppress them may be dependent on the content of the data forming the preliminary query result, and/or may be dependent upon factors external to the data such as attributes of the requester. Optionally, embodiments may include a stored data access controller configured to handle queries in which the query includes a requester ID identifying the source of the query; in such embodiments the suppression module is operable to obtain access attributes associated with the requester ID; and the suppression condition comprises at least one criterion dependent upon the access attributes associated with the requester ID.

Advantageously, being able to identify the requester enables the suppression module to tailor the suppression to the individual requester. For example, it may be that requesters, that is, users of an interface querying the stored data, have access levels, and access control information attributed to a label specifies a maximum access level of a requester for which data values (of either or both of the subject graph node or object graph node) are to be suppressed. The criterion being dependent upon the access attributes associated with the requester ID means that whether or not the criterion is deemed to be satisfied or fulfilled is determined by the access attributes.

Optionally, the access attributes comprise a requester access level from among a graded sequence of requester access levels; the suppression condition comprises a requester access level criterion which specifies a requester access level from among the graded sequence of requester access levels; and the suppression module is configured to compare the specified requester access with the requester access level attributed to the requester, and in dependence upon the result of the comparison, to determine whether or not the requester access level criterion is satisfied.

For example, the requester access level criterion may be a maximum requester access level for which the data value is suppressed. A requester access level exceeding the maximum requester access level does not satisfy the requester access level criterion, and the data value will not be suppressed in that instance.

In embodiments, the data items may be triples each consisting of a data value for each of three triple elements, the three triple elements being:
 a subject, identifying the subject graph node linked by the labelled link encoded by the data item;
 an object, identifying the object graph node linked by the labelled link encoded by the data item; and
 a predicate, being the label of the labelled link encoded by the data item.

In particular, the data items may be RDF triples, that is, triples adhering to the RDF standard formalised data structure for triples. Triples provide a data item format that is suited to encoding graph data, by characterising the graph data as a plurality of subject-predicate-object expressions. In that context, the subject and object are graph nodes of the graph data, and as such are entities, objects, instances, or concepts, and the predicate, or labelled link, is a representation of a relationship between the subject and the object. The predicate asserts something about the subject by providing a specified type of link to the object. For example, the subject may denote a Web resource (for example, via a URI), the predicate denote a particular trait, characteristic, or aspect of the resource, and the object denote an instance of that trait, characteristic, or aspect. In other words, a collection of triple statements intrinsically represents directional graph data. The RDF standard provides a formalised structure for such triples.

Embodiments provide an authorisation scheme for controlling access to stored data. For example, in terms of the XACML standard, embodiments provide a policy enforcement point (PEP), and to that end may be configured to operate in accordance with other functional units such as a policy administration point (PAP), policy decision point (PDP), policy information point (PIP), and one or more other functional units or modules. For example: selectively suppressing information may further comprise enforcing a data access policy, the data access policy comprising one or more rules applicable by the suppression module, the one or more rules being enforceable by the suppression module to determine which information to suppress from among the preliminary query results.

Joining together several databases with varying schema and different data access control methods is problematic and can result in queries being slow to process and difficult to implement a single data access policy. Advantageously, embodiments provide an access control technique that is independent of the database schema, by attributing access control information to the labels of the labelled links rather than embedding such information in the data items themselves. Furthermore, embodiments enable data access enforcement rules to be modified over time without updating the stored data themselves.

Particular embodiments may be realised in which the stored data is federated databases rather than a single database. For example, the data items encode more than one graph database, and each of the more than one graph databases have individual search and data retrieval functions.

Furthermore, it may be that each of the more than one graph databases are stored on distinct data storage units. The databases may be accessible via separate dedicated search and retrieval functions, which search and retrieval functions are configured to return preliminary query results to the suppression module, which then applies access control based on the labels of the labelled links of the data items included in the preliminary query result by suppressing data values in accordance with access control information attributed to the labels of the labelled links of the data items included in the preliminary query result and thus generates a revised version of the preliminary query result from which information has been removed. The revised version is output. The suppression module is centralised for the more than one graph databases, and thus is independent of the individual database schema.

Embodiments may comprise a data access controller as described above and as defined in the claims, and additionally include a data storage apparatus such as a hard disk or a server with a storage unit. For example, such a data storage apparatus may include a database management system which is configured to receive and respond to queries, and thus provide preliminary query results to the suppression module.

Embodiments of another aspect include a data storage system, comprising: a data storage apparatus configured to store data items encoding graph data, each data item being composed of data values encoding a labelled link between a subject graph node and an object graph node; and a stored data access controller as defined in the stored data access controller claims.

Embodiments of another aspect include a data access control method for controlling access to data items encoding graph data and stored in a data storage apparatus, each data item being composed of data values encoding a labelled link between a subject graph node and an object graph node; the method comprising: receiving a query requesting, as a query result, a specified subset of the data items stored in the data storage apparatus, and configured to obtain data items belonging to the specified subset from the data storage apparatus as a preliminary query result; generating a revised version of the preliminary query result by selectively suppressing information from the preliminary query result; and output, as the requested query result in response to the received query, the revised version of the preliminary query result; wherein selectively suppressing information comprises, for the or each of one or more graph nodes, suppressing the data value representing the graph node in accordance with access control information attributed to the label of a labelled link between the graph node and another graph node, the graph node being either a subject graph node or an object graph node.

Embodiments of another aspect include a computer program which, when executed by a computing device, causes the computing device to execute the above method.

Such a computing device may be a server or storage unit or other computer, and the process may be performed by loading a set of instructions, stored as a computer program, into memory and executing them with a processor. Hence, the modules are functional modules realised by hardware components executing software, which software itself may be an embodiment of the present invention. A computing device embodying the invention may include one or more of memory, storage, processor, and I/O devices.

Embodiments of another aspect include a computer program which, when executed by a computing device, causes the computing device to function as the stored data access controller as defined in the claims.

Although the aspects (software/methods/apparatuses) are discussed separately, it should be understood that features and consequences thereof discussed in relation to one aspect are equally applicable to the other aspects. Therefore, where a method feature is discussed, it is taken for granted that the apparatus embodiments include a unit or apparatus configured to perform that feature or provide appropriate functionality, and that programs are configured to cause a computing apparatus on which they are being executed to perform said method feature.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

BRIEF DESCRIPTION OF THE DRAWINGS

A detailed description of invention embodiments will now be provided, with reference to the accompanying drawings, in which.

DETAILED DESCRIPTION

Figure 1:
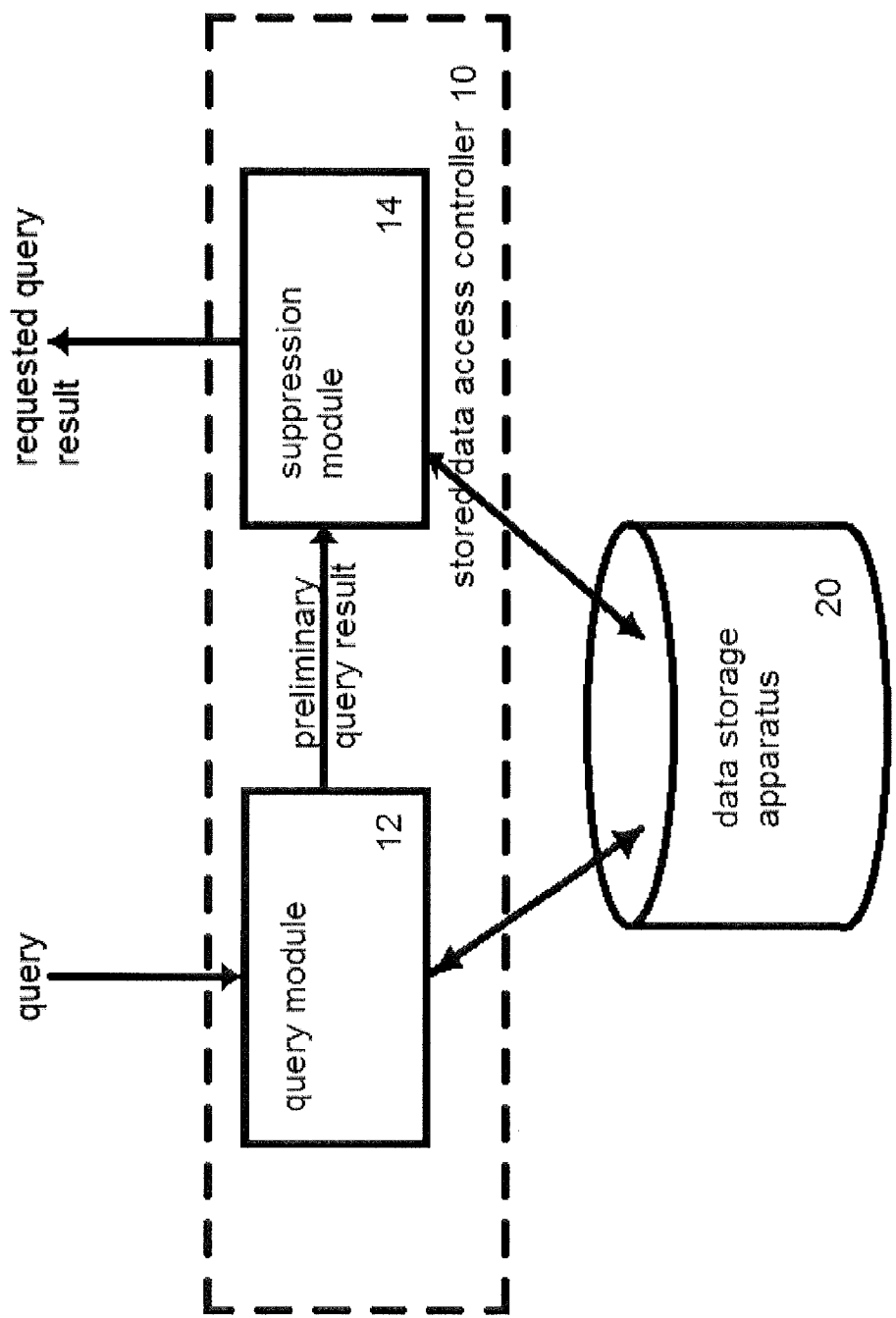
FIG. 1 illustrates a stored data access controller and flow of information in an invention embodiment.

FIG. 1 illustrates a stored data access controller 10 embodying the present invention. The stored data access controller 10 may be realised by dedicated hardware, or by software running on generalised computer hardware including a CPU, memory, storage, and I/O units. As software, the stored data access controller may be an encoded memory, a set of instructions stored on a transitory storage medium, a set of instructions stored on a non-transitory storage medium, or a computer program in any form. The stored data access controller may be provided as a component of a database management system or of a stored data management system. The stored data access controller may be implemented as a stored data access controller for a single database or for a plurality of databases.

The stored data access controller comprises a query module 12 and a suppression module 14. The query module 12 and/or the suppression module 14 are functional modules, and may be realised by dedicated hardware or by software running (or being executed by) generalised hardware. The stored data access controller 10 may be the sum of the query module 12 and the suppression module 14, or may include additional functional modules, for example, one or more functional modules required to implement an XACML standard compliant data access controller.

The stored data access controller 10 is illustrated in association with a data storage apparatus 20. The data storage apparatus 20 may comprise one or more databases storing encoded graph data, in addition to a management entity for the or each database. The management entities may be configured to carry out read or write requests as instructed by a controller such as the stored data access controller 10. For example, such management functions may be configured to return copies of data items matching query criteria on behalf of the query module 12. The data storage apparatus 20 is configured to store data items encoding graph data, each data item being composed of data values encoding a labelled link between a subject graph node and an object graph node. The stored data access controller 10 is configured to control access to those stored data items.

Controlling access to the stored data items includes receiving queries and responding to each query by outputting a response, albeit with the possibility that said output response may be a query result including information from the stored data items, or may be null.

Information from data items is considered to be a composite expression including the data values composing a data item, for example, a value of one or more data elements from a data item, or data derived from said data values. Data derived from said data values may comprise, for example, a count of a number of data values or data items, a masked/hashed or some other form of reduced version of a data value, or some other from of data describing stored data values.

The query module 12 is configured to receive a query requesting, as a query result, a specified subset of the data items stored in the data storage apparatus 20. The query module 12 is further configured to obtain data items belonging to the specified subset from the data storage apparatus 20 as a preliminary query result. The query module 12 may be configured to perform some processing in order to adapt the received query into a form suitable for submitting to the data storage apparatus 20. Such processing may be modified for each database in an implementation in which the data storage apparatus comprises more than one database. The specification of the subset included in the received query is submitted by the query module to the data storage apparatus, albeit optionally in a modified form. The data storage apparatus 20 is configured to respond to the query module 12 with data items belonging to the specified subset. This submission and response is represented by the bi-directional arrow in FIG. 1.

The query module 12 may receive the query from an application being operated by a user, from another machine, or via any form of interface enabling a subset to be defined or otherwise specified. The query may set one or more boundaries or ranges or other criteria which data values of particular data elements within stored data items must fulfil in order for the data item to be included in the query result output in response to the query. However, there may be additional criteria applied to the data items before they are output as a query result, which additional criteria are outside the control of the requester (user or application), such as those applied by the suppression module 14. The information retrieved from the data storage apparatus in accordance with the received query may be considered to be the preliminary query result. The remaining information from the preliminary query result following suppression by the suppression module 14 may be considered to be the output query result.

The received query may specify in what format and to what location the requested query result should be transferred or written. Alternatively or additionally, the requested query result may be simply returned to the requesting entity.

The query module 12 may be configured to perform some processing on the data items received from the data storage apparatus. For example, it may be that the query requested information about a subset of data items instead of or in addition to copies of the data items themselves, for example, one or more boundaries of the data values of data items fulfilling certain criteria, or a count of data items fulfilling a certain criteria. Such information (which may be referred to as related information) may be assembled or generated by the query module 12. The preliminary query result including the data items retrieved from the data storage apparatus 20 and any related information is passed to the suppression module 14. Alternatively, such processing may be performed by the suppression module 14.

The suppression module 14 is configured to obtain the preliminary query result from the query module 12, to generate a revised version of the preliminary query result by selectively suppressing information from the preliminary query result, and to output, as the requested query result in response to the received query, the revised version of the preliminary query result. Selectively suppressing information comprises, for the or each of one or more graph nodes (subject graph nodes or object graph nodes), suppressing the data value representing the graph node in accordance with access control information attributed to the label of a labelled link between the graph node and another graph node, the graph node being either a subject graph node or an object graph node. That is to say, the selective element of selectively suppressing information is the selection of which data values to suppress in dependence upon whether or not, and what, access control information is attributed to the label of the labelled link (or name of the predicate) linking the data value (or the graph node it represents) to another data value (or the graph node it represents). The suppression module 14 is configured to query the data storage apparatus 20 for access control information relating to the preliminary query result. Effectively, certain types of relationships (labels of labelled links) between graph nodes are regulated or secure relationships, and information setting out the manner in which graph nodes linked by those relationships are to be regulated (access control information) is stored in association with an identifier (label or name) of the relationship. The suppression module 14 is configured to retrieve the access control information attributed to the labels of labelled links included in the preliminary query result, and to perform processing in accordance with the retrieved access control information to generate a revised version of the preliminary query result in which certain information (for example, data values) is suppressed. It is the revised version of the preliminary query result that is output as the requested query result. Thus, the data storage apparatus 20 is a generic data storage apparatus configured to store both data items and access control information, either as separate data sources, or as a single unified data source in which access control information is embedded into the data items.

Figure 2:
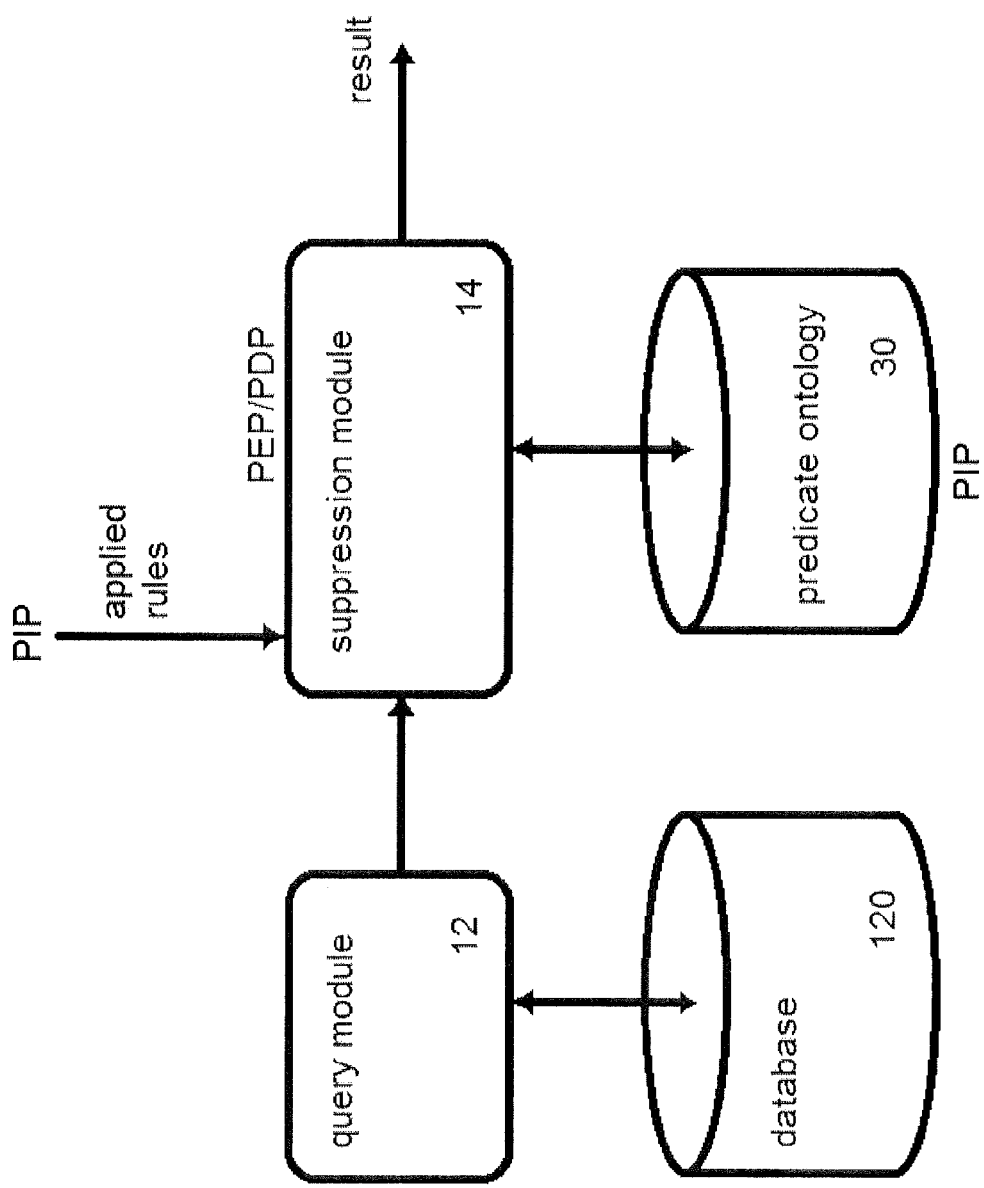
FIG. 2 illustrates an alternative architecture of an invention embodiment.

FIG. 2 illustrates a further embodiment. The stored data access controller 10 is not explicitly shown in FIG. 2, but is composed of the query module 12, the suppression module 14, and optionally the predicate ontology 30. The predicate ontology 30 may be stored as part of the stored data access controller 10, or may be provided externally to the stored data access controller 10 and be accessible (for read accesses) by the stored data access controller 10.

The database 30 stores data items which have a data value representing the label of a labelled link between two graph nodes. It is the label which determines the access control information that will be applied to the data item by the suppression module 14. Therefore, the data items stored on the database are effectively embedded with data access policy enforcement (could be moved to FIG. 1 unified example).

The predicate ontology 30 may be implemented as a storage unit with a management system and stored data, or may be simply the stored data themselves. The predicate ontology 30 is functionally equivalent to the predicate ontology storage unit mentioned elsewhere in this document, and is configured to store the label of each of a plurality of labelled links from the encoded graph data in association with access control information attributed to the label. The form of the association between access control information and particular labels may be realised by triples, for example, RDF triples, in which a label of labelled links in the data graph is the subject, and the access control information, or an identifier thereof, is the object. The predicate ontology 30 is accessible to the suppression module 14. For example, the suppression module 14 may submit a query to the predicate ontology 30 containing a label. The predicate ontology returns either: null if no access control information is associated with the label; or access control information stored in association with the label in the predicate ontology 30; or an identifier stored in association with the label in the predicate ontology, which identifier can be used to determine which access control information to apply to the data item having the label.

The query module 12 may be referred to as a query handling unit, a query handling system, or a query engine. The query module 12 in FIG. 2 is functionally equivalent to the query module 12 in FIG. 1.

The suppression module 14 may be referred to as a suppression system or a suppression unit. The suppression module 14 in FIG. 2 is functionally equivalent to the suppression module 14 in FIG. 1.

The suppression module 14 is labelled as a policy enforcement point (PEP) or a policy decision point (PDP) in FIG. 2. The suppression module 14 may fulfil either or both roles in an XACML implementation. A policy enforcement point requests a policy decision point to decide whether or not to authorise access to data. In the context of the embodiment, the suppression module 14 is configured to obtain preliminary query results from the query module 12, which triggers a decision to be made as to whether any of the information in the preliminary query result is to be suppressed from the output query result. The policy decision point (PDP) evaluates applicable policy and renders an authorisation decision. In the context of the embodiment, the suppression module 14 is configured to make a decision about whether or not (and how and which) data values from each data item included in the preliminary query result should be suppressed by querying the predicate ontology 30 with the label of the labelled link in the data item to obtain any access control information attributed to the label and stored in the predicate ontology 30. The access control information may include the information necessary for the suppression module 14 to decide whether or not to suppress data values from the data item from the output query result. Alternatively, the access control information retrieved from the predicate ontology 30 may include an identifier which is combined with applied rules received at the suppression module 14 from a policy information point to generate information necessary to decide whether or not to suppress data values from the data item. In addition to information required to decide whether or not to suppress data values from data items in the output query result, access control information may define or identify information defining conditions enabling the suppression module 14 to decide in which cases the suppression should be performed, information for determining which data values from the data item to suppress, and/or information for determining the form of suppression.

The data storage apparatus 20, whether it is implemented as the database 120 or in some other form, is configured to store encoded graph data. Relational databases store data in rows and columns. The rows and columns compose tables that need to be defined before storing the data. The definition of the tables and the relationship between data contained on these tables is called a schema. A relational database uses a fixed schema. Graph databases represent a significant extension over relational databases by storing data in the form of nodes and arcs, where a node represents an entity or instance, and an arc represents a relationship of some type between any two nodes. In an undirected graph, an arc from node A to node B is considered to be the same as an arc from node B to node A. In a directed graph, the two directions are treated as distinct arcs.

Graph databases are used in a wide variety of different applications that can be generally categorized into two major types. The first type consists of complex knowledge-based systems that have large collections of class descriptions (referred to as "knowledge-based applications"), such as intelligent decision support and self learning. The second type includes applications that involve performing graph searches over transactional data (referred to as "transactional data applications"), such as social data and business intelligence. Many applications may represent both types. However, most applications can be characterized primarily as either knowledge-based or transactional data applications. Graph databases can be used to maintain large "semantic networks" that can store large amounts of structured and unstructured data in various fields. A semantic network is used as a form of knowledge representation and is a directed graph consisting of nodes that represent concepts, and arcs that represent semantic relationships between the concepts.

There are several types of graph representations. Graph data may be stored in memory as multidimensional arrays, or as symbols linked to other symbols. Another form of graph representation is the use of "tuples," which are finite sequences or ordered lists of objects, each of a specified type. A tuple containing n objects is known as an "n-tuple," where n can be any non-negative integer greater than zero. A tuple of length 2 (a 2-tuple) is commonly called a pair, a 3-tuple is called a triple, a four-tuple is called a quadruple, and so on.

The Resource Description Framework (RDF) is a general method for conceptual description or modeling of information that is a standard for semantic networks. The amount of RDF data that is available nowadays is growing and it is already impossible to store it in a single server. In order to be able to store and search large amounts of data, the data must be maintained in multiple servers. Adding, deleting and querying data must be done in a coordinated way, using algorithms and data structures specially tailored for distributed systems. It is desirable to store graph data in a way which enables computationally efficient querying, maintenance, and manipulation of the data.

Optionally, the triples may be Resource Description Framework (RDF) triples. Throughout this document, it should be understood that where specific references to "RDF triple(s)" are made, it is an exemplary form of triple, conforming to the RDF standard. Furthermore, references to "triple(s)" include the possibility that the triple in question is an RDF triple.

The Resource Description Framework is a general method for conceptual description or modeling of information that is a standard for semantic networks. Standardising the modeling of information in a semantic network allows for interoperability between applications operating on a common semantic network. RDF maintains a vocabulary with unambiguous formal semantics, by providing the RDF Schema (RDFS) as a language for describing vocabularies in RDF.

The triples provide for encoding of graph data by characterising the graph data as a plurality of subject-predicate-object expressions. In that context, the subject and object are graph nodes of the graph data, and as such are entities, objects, instances, or concepts, and the predicate is a representation of a relationship between the subject and the object. The predicate asserts something about the subject by providing a specified type of link to the object. For example, the subject may denote a Web resource (for example, via a URI), the predicate denote a particular trait, characteristic, or aspect of the resource, and the object denote an instance of that trait, characteristic, or aspect. In other words, a collection of triple statements intrinsically represents directional graph data. The RDF standard provides formalised structure for such triples.

Optionally, each of one or more of the elements of the triple (an element being the predicate, the object, or the subject) is a Uniform Resource Identifier (URI). RDF and other triple formats are premised on the notion of identifying things (i.e. objects, resources or instances) using Web identifiers such as URIs and describing those identified 'things' in terms of simple properties and property values. In terms of the triple, the subject may be a URI identifying a web resource describing an entity, the predicate may be a URI identifying a type of property (for example, colour), and the object may be a URI specifying the particular instance of that type of property that is attributed to the entity in question, in its web resource incarnation. The use of URIs enables triples to represent simple statements, concerning resources, as a graph of nodes and arcs representing the resources, as well as their respective properties and values. An RDF graph can be queried using the SPARQL Protocol and RDF Query Language (SPARQL). It was standardized by the RDF Data Access Working Group (DAWG) of the World Wide Web Consortium, and is considered a key semantic web technology. SPARQL allows for a query to consist of triple patterns, conjunctions, disjunctions, and optional patterns.

A triple is a simple data unit representing information in a graph. Depending on the implementation, triples may be small in size. A triple may represent information about, for example, a web resource. DBPedia is an online data store representing information about real-world entities. The following RDF triples are exemplary of the form in which triples may be stored in data items in embodiments of the present invention. The following RDF triples i)-iv) represent information about Aristotle (a real-world entity) stored as a web resource at http://dbpedia.org/resource/Aristotle. "http://dbpedia.org/resource/Aristotle http://dbpedia.org/ontology/birthPlace http://dbpedia.org/resource/Stageira" "http://dbpedia.org/resource/Aristotle http://purl.org/dc/elements/1.1/description\"Greek philosopher\"@en" "http://dbpedia.org/resource/Aristotle http://www.w3.org/1999/02/22-rdf-syntax-ns#type http://xmlns.com/foaf/0.1/Person" "http://dbpedia.org/resource/Aristotle http://xmlns.com/foaf/0.1/name\"Aristotle\"@en"

Each triple represents some information about Aristotle. For example, i) represents the statement that the resource represented by the URI http://dbpedia.org/resource/Aristotle (the subject) has a link to another resource, the link defining a birthplace (the predicate), which is a relationship type defined at http://dbpedia.org/ontology/birthPlace, and the object linked to the subject by the "birthplace" relationship is the resource represented by the URI http://dbpedia.org/resource/Stageira. In other words, the triple i) represents the information that Aristotle is linked to Stageira as his birthplace. Similarly, triple ii) represents the information that the web resource . . . Aristotle (the subject) is linked to . . . "Greek Philosopher" (the object) as a description (the predicate). Triple iii) represents the information that the web resource . . . Aristotle (the subject) is a Person (the object) type of resource (predicate). Triple iv) represents the information that the web resource found at the URI . . . Aristotle (the subject) is linked to a string object "Aristotle" (the object) by the relationship "name" (the predicate). The predicate "name" may be stored with associated access control information in a predicate ontology 30.

Figure 3:
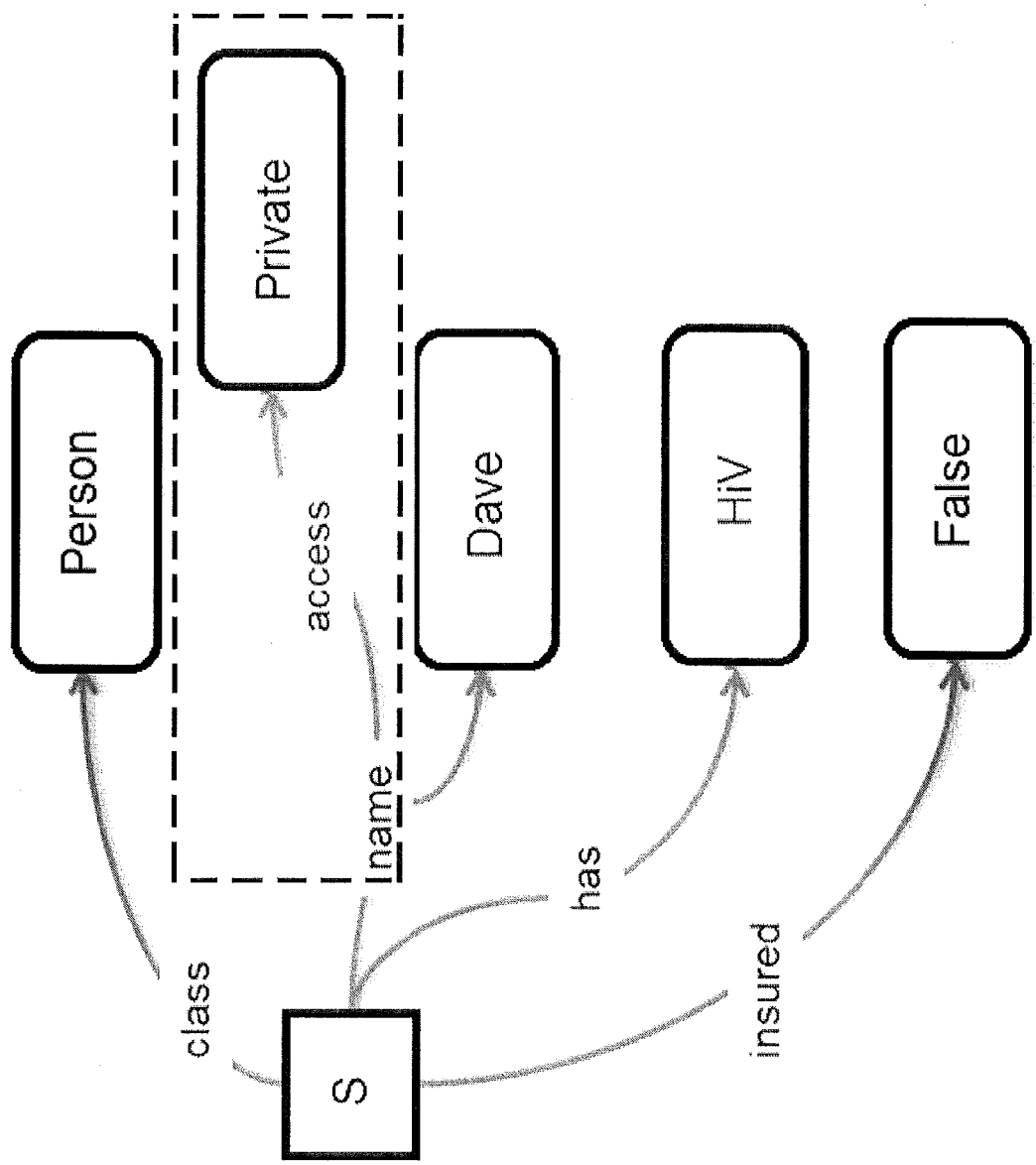
FIG. 3 illustrates exemplary stored data to which invention embodiments are applicable.
Figure 4:
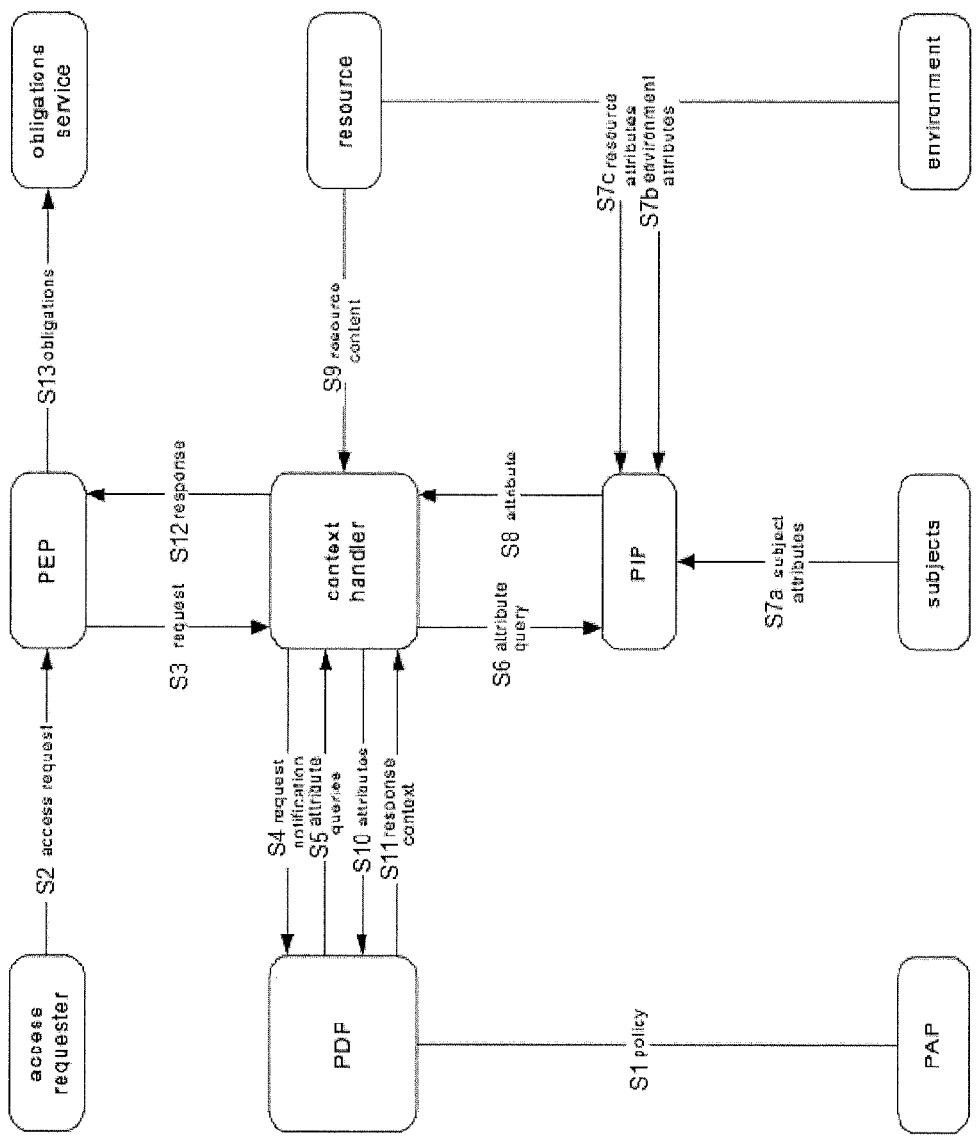
FIG. 4 illustrates the flow of data in an XACML compliant access control system.

FIG. 3 illustrates an exemplary data graph stored in a data storage apparatus 20 of an invention embodiment. The data graph of FIG. 3 combines a data graph encoded in data items (triples) with predicate ontology data, which predicate ontology data may be stored in a separate, dedicated storage unit. The information within the dashed box is stored within the predicate ontology. The label of the labelled link 'name' is stored in both the main data graph and as part of the predicate ontology 30.

The data graph of FIG. 3 represents knowledge about a subject identified as 'S'. In addition, the data graph is extended by information from the predicate ontology 30, which attributes access control information to the label of one of the labelled links. Labelled arrows connecting graph nodes represent labelled links between the connected graph nodes, with the label being the label of the labelled link, or predicate. Each labelled link between two graph nodes represents a relationship between those graph nodes, with the nature/type/name of the relationship being defined by the label. The boxes (with either sharp corners or curved corners) represent graph nodes. In each relationship defined in the data graph, the destination graph node of the arrow is the object of a labelled link, and the source graph node is the subject of the labelled link. The text inside the boxes represent data values, and the labels also represent data values. A data item encoding the data graph comprises three data values (or values of three data elements): one data value of the subject graph node, one data value of the object graph node, and a data value of the label of the labelled link between the subject graph node and the object graph node.

The data forming part of the predicate ontology is structurally distinct from the main data graph by virtue of the data element at the source of the labelled link being a label rather than a graph node. In that sense, the label itself may be considered to be a graph node of the predicate ontology 30, but in the context of the main data graph is a label.

As a usage example, the query module 12 may receive a query specifying all properties of the subject 'S' as a subset. The query module 12 queries the data storage apparatus 20 and obtains four data items:

S, class, Person
S, name, Dave
S, has, HiV
S, insured, False.

The four data items (or copies thereof) are forwarded to the suppression module 14 as the preliminary query result. The suppression module 14 queries the predicate ontology 30 (which may be external to the suppression module 14 or may be provided as a component of the suppression module) with each of the labels of the labelled links ("class", "name", "has", and "insured") to check for access control information attributed to the labels.

For the labels "class", "has", and "insured", the query response is null, so there is no access control information stored in the predicate ontology 30 attributed to those labels. Hence, the data items containing those labels are not the subject of access control by the suppression module 14. In the case of "name", on the other hand, the query returns access control information "Private". The suppression module 14 stores rules (for example, supplied by a policy information point), and uses the identifier "Private" to obtain access control rules, which are an example of access control information, to be applied to data items whose label is attributed the identifier "Private". As an example, the rule may be "if label=Private remove data item from query result".

Therefore, the suppression module 14 is configured to generate a revised version of the preliminary query result in accordance with the access control information, and hence in the revised version the data item "S, name, Dave" does not appear. The suppression module 14 is configured to output the following:

| |
|---|
| S, class, Person |
| S, has, HiV |
| S, insured, False | as query results in response to the entity from which the query was received.

As a further usage example, in which the data of FIG. 3 is queried, a query represented by the following pseudo query is received by the query module 12:

| | | |
|---|---|---|
| { | (s? insured False) | && |
| | (s? has HiV) | && |
| | (S? name D*) } count -> 1 | |

That is to say, if the three conditions about the unknown subject are satisfied, the count increases by 1. The rules that the suppression module 14 is configured to apply in the case of access control information indicating that a data item is "Private" are implementation dependent. In this case, although the data values of a data item having a label designated as "Private" cannot be included in a query result, the data item can still be used in compiling counts. Hence the output query result is "1". The preliminary query result includes the data items specified by the query, the suppression module 14 is configured to compile counts and other information about the data items. Alternatively, it may be that the count is compiled by the query module 12, and since no labels are included in the preliminary query result, no access control information is retrieved, and the count is output in the form it appears in the preliminary query result.

In the next usage case, the data of FIG. 3 is again queried. In this case, particular data values are requested in the query, namely the identity of any subject which has the properties "insured false", "has HiV" and also the object graph node linked to the subject by a labelled link having the label "name". The query is represented by the following pseudo query:

| | | |
|---|---|---|
| { | (s? insured False) | && |
| | (s? has HiV) | && |
| | (s? name o?) } | |

The preliminary query result assembled by the query module 12 and output to the suppression module 14 is "S Dave".

In addition to suppression in accordance with access control information attributed to labels, there may be general filtering rules applied to all preliminary query results. For example:

[1] If (s? class Person) suppress s?

The rule can be interpreted as follows: if a subject is queried which is linked to "Person" by a labelled link having the label "class", then suppress the data value of the subject from the query result. If the filtering rule [1] were applied to the preliminary query result "S Dave", the revised version of the preliminary query result would be "Dave".

Alternatively or additionally, filtering rules can be made dependent upon the access control information that is attributed to the label. For example, consider the following filtering rule:

[2] If (s? class Person) suppress o? where {(s? p? o?) && (p? access Private)}

The rule can be interpreted as follows: if a subject is queried which is linked to "Person" by a labelled link having the label "class", suppress the object data value of a data item for which the access control information "Private" is attributed to the predicate (the label of the labelled link). Hence, because "name" is a label which is attributed access control information "Private", the condition is fulfilled, and the data value of the object graph node linked by the label "name" is to be suppressed from the preliminary query result in generating the revised version. If the filtering rule [2] were to be applied to the preliminary query result [S Dave], the revised version of the query result would be "S".

As a third example of filtering rules, the possibility of anonymising, randomising, or hashing information is considered.

[3] If (s? class Person) hash s?

The rule can be interpreted as follows: if a subject is queried which is linked to "Person" by a labelled link having the label "class", then hash the data value representing the subject graph node from the preliminary query result. In the present usage example in which the preliminary query result is "S Dave", the revised version of the preliminary query result would be "(# of S) Dave".

A fourth example combines principles of previous filtering rules, in this example, the suppression that is performed in the case of a "private" property being included in the query result is hashing the data value of the object graph node linked to by the labelled link attributed the access control information "Private", rather than removing said data value from the preliminary query result altogether.

[4] If (s? class Person) suppress o? [o? = "true"] where {(s? p? o?) && (p? access Private)}

The rule can be interpreted in the same way as filtering rule [2], with the exception that in rule [4] the suppression module 14 is instructed to suppress o? from the query results by replacing its actual data value with a predetermined fixed value ("true") rather than by removing it altogether. Applying filtering rule [4] to the preliminary query result "S Dave" would generate the revised preliminary query result "S true".

As a further example, filtering rules can be combined. For example, consider the filtering rule:

[5] If [1] and [2]

Which can be interpreted as requiring that filtering rules [1] and [2] are applied. The result of applying filtering rule [5] to the preliminary query result "S Dave" would be " ", that is to say, both data values from the preliminary query result would be removed from the output revised version.

In implementations in which the stored data is federated databases rather than a single database, it may be that multiple label names which are equivalent are attributed the same access control information. In the example of FIG. 3, there may be a federated example in which the property "name" does not exist, but "first_name" and "family_name" exist. The predicate ontology 30 may store either or both labels "first_name" and "family_name" with the access control information "Private". Alternatively, the predicate ontology 30 may link "first_name" and/or "family_name" to "name" by equivalence links, or by subclass links, either of which denote an inheritance of the access control information from "name".

The invention claimed is:

1. A stored data access controller, configured to control access to data items encoding graph data and stored in a data storage apparatus, each data item encoding a labelled link between a subject graph node and an object graph node and being composed of a data value for each of the three elements, the three triple elements being:
 a subject, identifying the subject graph node linked by the labelled link encoded by the data item;
 an object, identifying the object graph node linked by the labelled link encoded by the data item; and
 a predicate, being the label of the labelled link encoded by the data item;
 the stored data access controller comprising a processor, a memory, and a data input/output unit, configured to:
 receive a query requesting, as a query result, a specified subset of the data items stored in the data storage apparatus, and configured to obtain data items belonging to the specified subset from the data storage apparatus as a preliminary query result;
 store the label of each of a plurality of labelled links from the encoded graph data in association with access control information attributed to the label, wherein access control information attributed to the label of a labelled link is identified by a data item having the form of a triple including the label of the labelled link as subject and data identifying the access control information as object;
 obtain the preliminary query result from the query module, to generate a revised version of the preliminary query result by selectively suppressing information from the preliminary query result, and to output, as the requested query result in response to the received query, the revised version of the preliminary query result;
 wherein selectively suppressing information comprises, for the or each of one or more graph nodes, suppressing the data value representing the graph node in accordance with the stored access control information attributed to the label of a labelled link between the graph node and another graph node, the graph node being either the subject graph node or the object graph node linked by the labelled link.

2. The stored data access controller according to claim 1, wherein suppressing data values comprises removing data values and/or anonymising data values.

3. The stored data access controller according to claim 1, wherein the access control information comprises a suppression condition and suppressing the data value representing the graph node in accordance with access control information comprises extracting the suppression condition, determining whether or not the suppression condition is satisfied, and if the suppression condition is satisfied, suppressing the data value.

4. The stored data access controller according to claim 3, wherein
 the query includes a requester ID identifying the source of the query;
 the stored data access controller is operable to obtain access attributes associated with the requester ID; and
 the suppression condition comprises at least one criterion dependent upon the access attributes associated with the requester ID.

5. The stored data access controller according to claim 4, wherein
 the access attributes comprise a requester access level from among a graded sequence of requester access levels;
 the suppression condition comprises a requester access level criterion which specifies a requester access level from among the graded sequence of requester access levels; and
 the stored data access controller is configured to compare the specified requester access with the requester access level attributed to the requester, and in dependence upon the result of the comparison, to determine whether or not the requester access level criterion is satisfied.

6. The stored data access controller according to claim 1, wherein selectively suppressing information further comprises enforcing a data access policy, the data access policy comprising one or more rules applicable by the stored data access controller, the one or more rules being enforceable by the stored data access controller to determine which information to suppress from among the preliminary query results.

7. The stored data access controller according to claim 1, wherein the data items encode more than one graph database, and each of the more than one graph databases is stored on distinct data storage apparatus having individual search and data retrieval functions.

8. The stored data access controller according to claim 1, wherein the access control information attributed to one label is inherited by other labels which are stored as children of the one label in the predicate ontology storage unit.

9. A data storage system, comprising:
 a data storage apparatus configured to store data items encoding graph data, each data item being composed of data values encoding a labelled link between a subject graph node and an object graph node; and
 a stored data access controller configured to control access to data items encoding graph data and stored in a data storage apparatus, each data item encoding a labelled link between a subject graph node and an object graph node and being composed of a data value for each of the three triple elements, the three triple elements being:
 a subject, identifying the subject graph node linked by the labelled link encoded by the data item;
 an object, identifying the object graph node linked by the labelled link encoded by the data item; and
 a predicate, being the label of the labelled link encoded by the data item;
 the stored data access controller comprising a processor, a memory, and a data input/output unit, configured to:
 receive a query requesting, as a query result, a specified subset of the data items stored in the data storage apparatus, and configured to obtain data items belonging to the specified subset from the data storage apparatus as a preliminary query result;
 obtain the preliminary query result from the query module, to generate a revised version of the preliminary query result by selectively suppressing information from the preliminary query result, and to output, as the requested query result in response to the received query, the revised version of the preliminary query result;

store the label of each of a plurality of labelled links from the encoded graph data in association with access control information attributed to the label, wherein access control information attributed to the label of a labelled link is identified by a data item having the form of a triple including the label of the labelled link as subject and data identifying the access control information as object wherein selectively suppressing information comprises, for the or each of one or more graph nodes, suppressing the data value representing the graph node in accordance with the stored access control information attributed to the label of a labelled link between the graph node and another graph node, the graph node being either the subject graph node or the object graph node linked by the labelled link.

10. A data access control method for controlling access to data items encoding graph data and stored in a data storage apparatus, each data item encoding a labelled link between a subject graph node and an object graph node and being composed of a data value for each of three tripled elements, the three triple element being:

a subject, identifying the subject graph node linked by the labelled link encoded by the data item;

an object, identifying the object graph node linked by the labeled link encoded by the data item; and a predicate, being the label of the labelled link encoded by the data item;

the method comprising:

receiving a query requesting, as a query result, a specified subset of the data items stored in the data storage apparatus, and obtaining data items belonging to the specified subset from the data storage apparatus as a preliminary query result;

storing the label of each of a plurality of labelled links from the encoded graph data in association with access control information attributed to the label, wherein access control information attributed to the label of a labelled link is identified by a data item having the form of a triple including the label of the labelled link as subject and data identifying the access control information as object;

generating a revised version of the preliminary query result by selectively suppressing information from the preliminary query result; and output, as the requested query result in response to the received query, the revised version of the preliminary query result;

wherein selectively suppressing information comprises, for the or each of one or more graph nodes, suppressing the data value representing the graph node in accordance with the stored access control information attributed to the label of a labelled link between the graph node and another graph node, the graph node being either the subject graph node or the object graph node linked by the labelled link.

11. A non-transitory storage medium storing a computer program which, when executed by a computing device, causes the computing device to execute a data access control method for controlling access to data items encoding graph data and stored in a data storage apparatus, each data item encoding a labelled link between a subject graph node and an object graph node and being composed of a data value for each of three triple elements, the three triple elements being:

a subject, identifying the subject graph node linked by the labelled link encoded by the data item;

an object, identifying the object graph node linked by the labelled link encoded by the data item; and a predicate, being the label of the labelled link encoded by the data item;

the method comprising:

receiving a query requesting, as a query result, a specified subset of the data items stored in the data storage apparatus, and obtaining data items belonging to the specified subset from the data storage apparatus as a preliminary query result;

storing the label of each of a plurality of labelled links from the encoded graph data in association with access control information attributed to the label, wherein access control information attributed to the label of a labelled link is identified by a data item having the form of a triple including the label of the labelled link as subject and data identifying the access control information as object;

generating a revised version of the preliminary query result by selectively suppressing information from the preliminary query result; and output, as the requested query result in response to the received query, the revised version of the preliminary query result;

wherein selectively suppressing information comprises, for the or each of one or more graph nodes, suppressing the data value representing the graph node in accordance with the stored access control information attributed to the label of a labelled link between the graph node and another graph node, the graph node being either the subject graph node or the object graph node linked by the labelled link.

12. A non-transitory storage medium storing a computer program which, when executed by a computing device, causes the computing device to function as a stored data access controller, configured to control access to data items encoding graph data and stored in a data storage apparatus, each data item encoding a labelled link between a subject graph node and an object graph node and being composed of a data value for each of three triple elements, the three triple elements being:

a subject, identifying the subject graph node linked by the labelled link encoded by the data item;

an object, identifying the object graph node linked by the labelled link encoded by the data item; and a predicate, being the label of the labeled link encoded by the data item;

the stored data access controller comprising:

a query module, configured to receive a query requesting, as a query result, a specified subset of the data items stored in the data storage apparatus, and configured to obtain data items belonging to the specified subset from the data storage apparatus as a preliminary query result;

a predicate ontology storage unit configured to store the label of each of a plurality of labelled links from the encoded graph data in association with access control information attributed the label, wherein access control information attributed to the label of a labelled link is identified by a data item having the form of a triple including the label of the labelled link as subject and data identifying the access control information as object; and a suppression module, configured to obtain the preliminary query result from the query module, to generate a revised version of the preliminary query result by selectively suppressing information from the preliminary query result, and to output, as the requested query result in response to the received query, the revised version of the preliminary query result;

wherein selectively suppressing information comprises, for the or each of one or more graph nodes, suppressing the data value representing the graph node in accordance with the access control information stored in the predicate ontology storage unit and attributed to the label of a labelled link between the graph node and another graph node, the graph node being either the subject graph node or the object graph node linked by the labelled link.

* * * * *